(12) United States Patent
Lecomte et al.

(10) Patent No.: US 7,377,288 B2
(45) Date of Patent: May 27, 2008

(54) PASSIVE DEVICE FOR BALANCING THE PRESSURE OF FIRST AND SECOND FLUIDS AND THE USE THEREOF

(75) Inventors: Michel Lecomte, Rueil-Malmaison (FR); Bruno Fichet, Sennecey Le Grand (FR); Eric Breuil, Lyons (FR)

(73) Assignee: Framatome ANP, Courbevoie (FR)

( * ) Notice: Subject to any disclaimer, the term of this patent is extended or adjusted under 35 U.S.C. 154(b) by 182 days.

(21) Appl. No.: 10/533,065

(22) PCT Filed: Oct. 28, 2003

(86) PCT No.: PCT/FR03/03212

§ 371 (c)(1),
(2), (4) Date: Apr. 28, 2005

(87) PCT Pub. No.: WO2004/044668

PCT Pub. Date: May 27, 2004

(65) Prior Publication Data

US 2006/0016476 A1  Jan. 26, 2006

(30) Foreign Application Priority Data

Oct. 30, 2002 (FR) .................................. 02 13620

(51) Int. Cl.
*G05D 11/03* (2006.01)
(52) U.S. Cl. ........................................ 137/98; 165/285
(58) Field of Classification Search .................. 137/98, 137/100 I; 165/285 X
See application file for complete search history.

(56) References Cited

U.S. PATENT DOCUMENTS

| | | | | |
|---|---|---|---|---|
| 353,704 A * | 12/1886 | Nash | ........................... | 137/98 |
| 2,581,855 A * | 1/1952 | Griffith | ........................... | 137/98 |
| 4,254,790 A * | 3/1981 | Eriksson et al. | ............. | 137/100 |
| 4,272,962 A * | 6/1981 | Viscovich et al. | .......... | 165/285 |
| 4,543,977 A | 10/1985 | Arav | | |
| 4,620,588 A * | 11/1986 | Pfouts et al. | ................ | 165/285 |
| 4,765,946 A * | 8/1988 | Dagard et al. | ............... | 165/285 |
| 4,770,094 A | 9/1988 | Schiel | | |
| 4,802,504 A * | 2/1989 | Politi | ....................... | 137/454.5 |
| 5,002,089 A * | 3/1991 | Reedy et al. | ............. | 137/493.8 |

FOREIGN PATENT DOCUMENTS

FR  1 027 361 A  5/1953

* cited by examiner

*Primary Examiner*—Stephen M Hepperle
(74) *Attorney, Agent, or Firm*—Connolly Bove Lodge & Hutz LLP

(57) ABSTRACT

The device comprises a first valve (35*a*) and a second valve (35*b*) each comprising a chamber (13*a*, 13*b*) communicating via an admission orifice (19*a*, 19*b*) with a circuit or a receptacle containing a first or a second fluid, and via an exhaust orifice (18*a*, 18*b*) with exhaust means for the first or the second fluid, at least one valve member (20*a*, 20*b*) mounted to move within the valve chamber (13*a*, 13*b*) between a position for closing and a position for opening the exhaust orifice (18*a*, 18*b*), a piston (22*a*, 24*a*, 22*b*, 24*b*) connected to the valve member (20*a*, 20*b*) and resilient return means (32*a*, 32*b*) for returning the valve member (20*a*, 20*b*) to a closed position. Each of the first and second pistons (22*a*, 24*a*, 22*b*, 24*b*) has a first face exposed to one of the first and second fluids, and an opposite second face subjected to a force exerted respectively by the second fluid or by the first fluid.

9 Claims, 1 Drawing Sheet

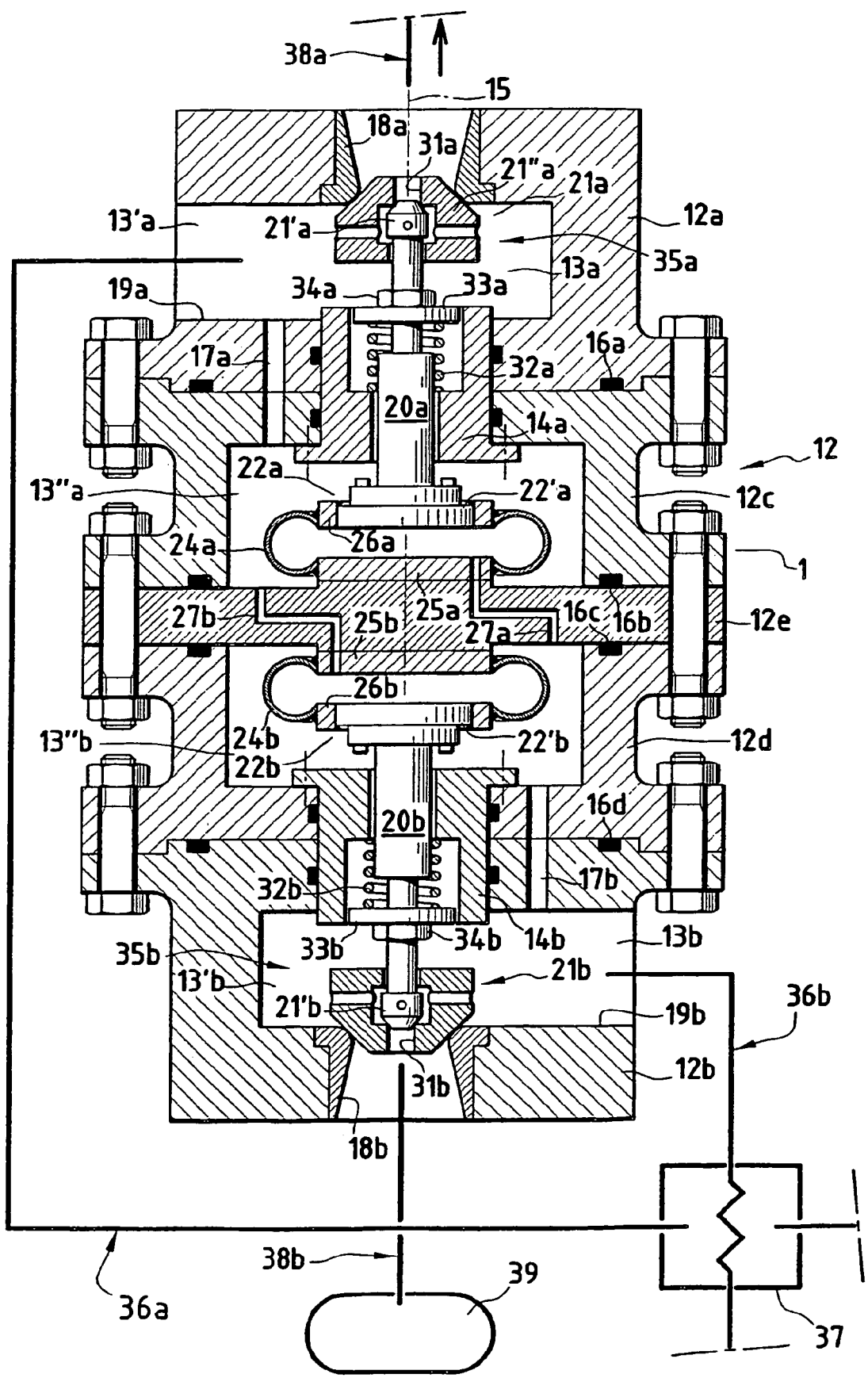

PASSIVE DEVICE FOR BALANCING THE PRESSURE OF FIRST AND SECOND FLUIDS AND THE USE THEREOF

The invention relates to a passive device for balancing the pressure of a first fluid in a first circuit or receptacle with the pressure of a second fluid in a second circuit or receptacle, and the invention also relates to the use of the device for balancing the pressure of two heat-exchange fluids.

In certain industries, fluids, e.g. gases, are used that are contained in receptacles or that are put into circulation in order to be used in an installation in which the fluids need to be at the same pressure or at least at pressures that differ little from each other.

For example, in installations for producing electricity from the heat produced by a high temperature nuclear reactor, heat exchangers are used such as plate heat exchangers designed to receive as a first heat exchange fluid a gas, such as helium, that is used for cooling the core of the nuclear reactor, and as a second heat exchange fluid a gas that contains nitrogen, e.g. air, that is used for driving a gas turbine and for boiling water to produce steam that is used in steam turbines.

One such device for producing electricity and the corresponding method are described in [French] patent application No. 02/04638 filed on Apr. 12, 2002 by FRAMATOME ANP.

When a heat exchanger such as a plate heat exchanger is used in such an installation, it is desirable to ensure that the heat exchanger operates with both heat exchange fluids at practically equal pressures, throughout all operating stages of the installation.

In an installation as described in the above-identified patent application in the name of FRAMATOME ANP, in which the primary helium and the secondary heat exchange gas are at pressures that are close to 60 bars and during normal operation of the installation, it is necessary to ensure that the pressure on either side of the heat exchange walls separating the primary helium from the secondary heat exchange gas never exceeds 5 bars. In addition, it is not possible to accept pressure gradients over time in excess of 5 bars in 60 seconds.

Under conditions associated with an incident or an accident (e.g. in the event of a pipe breaking in one of the circuits between which heat is being exchanged), it must be possible, exceptionally, and for a very short length of time, to accommodate a pressure difference of about 60 bars.

When operating under steady conditions, the two heat exchange gases are generally at pressures that are maintained within limits such that the critical pressure difference across the heat exchanger walls is never reached. The same is not true of transient conditions, and is even less true of operating under conditions involving an incident or an accident.

In order to be able to use heat exchangers that require a small pressure difference in operation between the heat exchange fluids, such as plate heat exchangers, given that such heat exchangers present very great advantages on other grounds, it is desirable, if not essential, to provide pressure balancer means between the primary and second gas circuits.

Such pressure balancer means must operate in totally automatic manner and must require no energy source external to the circuits between which pressures are to be balanced, in order to avoid any risk of the balancer failing to operate, since that would be damaging for the heat exchanger.

Patents Nos. U.S. Pat. No. 4,543,977, FR-1 027 361 and U.S. Pat. No. 4,770,094 disclose valves that make it possible to adjust, relative to each other, the pressures of two fluids in respective circuits or receptacles. Those devices make use of pistons that move in valve chambers serving to open or close fluid passages, possibly by means of valve members secured to the pistons. Leaktight closure of the fluid passages is ensured by pressing the pistons, or valve members secured to the pistons, against sealing seats of the valves. The fluids are kept apart by moving gaskets carried by the pistons.

For an installation using fluids contained in storage receptacles or circulating in utilization circuits, it can be necessary to balance pressures between first and second fluids used in the installation, while ensuring that the fluids remain permanently and completely separated throughout long-term use of the installation. It can be necessary or desirable to avoid using moving gaskets to keep the fluids separate, particularly when the fluids are at high temperature.

The object of the invention is to propose a device for balancing the pressures of first and second fluids respectively contained in first and second circuits or receptacles, which device operates safely and automatically without requiring an external energy source such as an electrical power supply, while maintaining complete separation between the fluids.

To this end, the balancer device of the invention comprises:

first and second valves respectively comprising first and second valve bodies respectively defining first and second chambers communicating via first and second admission orifices respectively with the first and second circuits or receptacles respectively containing the first and second fluids, and communicating via respective exhaust orifices with respective exhaust means for the first and second fluids, at least one first valve member and at least one second valve member mounted to move respectively in the first and second chambers along an axial actuation direction between a position for closing and a position for opening the exhaust orifices of the first and second chambers respectively, a first piston and a second piston each constituted by a rigid plate secured respectively to the first or to the second valve member, and a flexible metal wall of a bellows secured in leaktight manner to the rigid plate of the respective piston and to an element of the first and the second valve bodies respectively, so as to constitute a closed chamber having a wall that is deformable in the actuation direction, and first and second resilient return means for returning the first and second valve members respectively into the closed position; and the first closed chamber of the first piston of the first valve is in communication with the chamber of the second valve, and the closed chamber of the second piston of the second valve is in communication with the chamber of the first valve.

According to more particular characteristics that can be implemented separately or in combination:

the body of the first valve and the body of the second valve are interconnected and in axial alignment along a common actuation direction of the first and second valves so as to constitute a body of the balancer device, the chamber of the first valve and the chamber of the second valve being separated from each other by a wall extending transversely relative to the actuation direction of the body of the balancer device, said wall having fixed thereon, on a first side inside the chamber of the first valve, the metal wall of the bellows of the first piston, and on a second side along the actuation direction inside the chamber of the second valve, the metal wall of the bellows of the second piston, the separation wall of the body of the balancer device having passing therethrough a first channel for putting the first closed chamber of the first piston into communication with the chamber of the second valve, and a second channel putting the closed chamber of the second piston into communication with the chamber of the first valve;

the body of the first valve and the body of the second valve are built up of two assembled-together portions respectively defining a first portion of the valve chamber in which the admission opening and the exhaust opening are provided, and a second portion in which there are disposed the first and second pistons respectively, the first and second portions of the chambers of the first and second valves being separated by respective walls of the body of the valve having respective openings formed therethrough on the axial actuation direction and in which there are disposed respective guide bearings for the corresponding valve members, each of which comprises a rod mounted on the axial actuation direction with one axial end secured to the corresponding piston and with the opposite end, inside the first portion of the valve chamber, carrying a shutter member;

the first valve member of the first valve and the second valve member of the second valve include respective shutter assemblies for shutting the exhaust openings, each of said assemblies including a pilot valve shutter member secured to one end of a rod of the valve member and a main shutter member having a surface for bearing against a seat of the exhaust opening and a central cavity in which the shutter member of the pilot valve is engaged with freedom to move along the direction of the actuation axis of the valve, the pilot valve shutter member communicating with the outside of the main valve via a channel that the pilot valve shutter member is capable of closing;

the first and second resilient return means of the first and second valve members are constituted by helical springs interposed between respective thrust surfaces of the first and second valve members and thrust surfaces of a valve body corresponding to the balancer device; and the helical spring has at least one of its ends thrusting against a thrust plate of position that is adjustable along the actuation direction of the valve of the balancer device.

The device of the invention can be used for adjusting the pressures of two fluids to values that are substantially equal in respective feed circuits for first and second heat exchanger portions of a heat exchanger.

In particular, the first heat exchanger circuit may be for receiving a secondary heat exchange gas containing nitrogen in an installation for producing electricity by using a high temperature nuclear reactor, and the second heat exchange circuit is the primary circuit of the high temperature nuclear reactor cooled by a gas such as helium.

In order to make the invention well understood, there follows a description by way of example given with reference to the accompanying FIGURE of a pressure-balancer device of the invention.

The sole FIGURE is an axial section view of a pressure-balancer device of the invention together with two heat exchange circuits between which pressure is to be balanced.

The balancer device, given overall reference 1, comprises a body 12 of overall shape in the form of a hollow cylinder defining internal chambers 13a and 13b which are the chambers respectively of a first valve 35a for adjusting the pressure of a first fluid and of a second valve 35b for adjusting the pressure of a second fluid.

For example, the first fluid may be a gas containing nitrogen and the second fluid may be helium for cooling a high temperature nuclear reactor. The first fluid, which by way of example is air, flows in a first circuit 36a connected to a first opening for admitting the first fluid, and the second fluid, which for example is helium for cooling a high temperature nuclear reactor, flows in a second circuit 36b connected to a second admission opening of the balancer device 1.

The air and helium circuits 36a and 36b are connected to a heat exchanger 37 for heating the air by using the helium which takes heat from the core of the nuclear reactor.

The body 12 of the balancer device 1 is made up of a plurality of portions 12a, 12b, 12c, 12d, and 12e which are assembled together end to end along the actuating axis 15 of the balancer device, by means of flanges, screws or threaded rods, and nuts, with sealing gaskets such as 16a, 16b, 16c, and 16d being interposed.

By building up the body 12 of the balancer device from parts that are suitable for being assembled together, it is possible to simplify manufacture and to simplify the mounting of the internal members of the valves.

The respective chambers 13a and 13b of the two valves 35a and 35b constituting the balancer device and defined respectively by the portions 12a & 12c and 12b & 12d of the body 12, themselves each comprise two portions 13'a & 13"a or 13'b & 13"b which are separated from each other by a respective bearing 14a (or 14b) for guiding the corresponding valve member, as described below.

The two portions of each of the chambers 13a and 13b are interconnected by a corresponding channel 17a (or 17b) serving to put the two portions of each chamber at the same pressure.

The first portion 13'a (or 13'b) of each chamber 13a (or 13b) made inside the portion 12a (or 12b) of the body of the device has a respective admission opening 19a (or 19b) and a respective exhaust opening 18a (or 18b), with the exhaust opening being fitted with a valve seat against which the shutter member of the corresponding valve presses.

The admission opening 19a of the first chamber 13a is connected to a pipe connecting to the circuit 36a in which the first fluid circulates, and the exhaust opening 18a of the first chamber is connected to a pipe for exhausting the first fluid (e.g. air).

The admission opening 19b of the second chamber 13b is connected via a connection pipe to the circuit 36b for the second fluid (e.g. helium for cooling the high temperature nuclear reactor), and the exhaust opening 18b of the second chamber is connected to a pipe for exhausting helium to a storage tank 39.

The two valves for respectively adjusting the pressure of the first and second heat exchange gases are both made in the same manner, so only the first valve located in the chamber 13a is described below in detail, while also specifying the differences that exist relative to the second valve concerning the connections for pressurizing the valves.

The valve disposed in the chamber 13a for adjusting the pressure of the first fluid constituted by a gas containing nitrogen has a valve member 20a comprising a rod mounted to slide in the axial actuating direction 15 in the bearing 14a of the valve, and connected at a first end to a shutter assembly 21a, and at a second end to a piston 22a, 24a disposed inside the portion 13"a of the chamber 13a.

The piston 22a, 24a comprises a rigid plate 22a secured to the flexible wall of a metal bellows 24a which presents at least one toroidal fold centered on the actuation axis 15 of the balancer device.

The flexible wall of the bellows 24a is also secured by welding to a fastening plate 25a secured to the intermediate part 12e of the body 12 of the balancer device separating the chamber 13a of the first valve from the chamber 13b of the second valve.

In order to make the device easier to assemble, it is possible to use a bellows 24a assembled to the plate 25a by welding and subsequently fastened by mechanical means or by welding to the intermediate part 12e of the body 12 at the time the valve is itself assembled.

The deformable metal wall of the bellows 24a is preferably secured at its axial end remote from the plate 25a to a fastening ring 26a in which a plate 22'a is secured by welding at the time of assembly, which plate is in the form of a disk secured to the valve rod 20a that is guided by the first bearing 14a, thereby constituting the rigid plate 22a of the piston 22a, 24a.

The piston 22a, 24a thus presents an internal chamber that is totally closed at its periphery by the metal bellows 24a, at one of its axial ends by the plate 25a, and at its second axial end by the plate 22a of the piston. The outside surface of the piston that is subjected to the pressure inside the valve chamber constitutes its outside surface, and the inside surface of the closed chamber constitutes its inside surface.

A channel 27a formed through the intermediate part 12e of the body of the balancer device passes through the fastener plate 25a and puts the internal chamber of the piston 22a, 24a into communication with the second portion 13"b of the chamber 13b of the second valve.

Similarly, a channel 27b passing through the intermediate part 12e of the body 12 of the balancer device and a fastener plate 25b of the bellows 24b of the second valve puts the internal chamber of the piston 22b, 24b of the second valve 35b into communication with the second portion 13"a of the chamber 13a of the first valve.

The shutter assembly 21a connected to the end of the valve rod 20a comprises a small-diameter pilot valve shutter 21'a and a large-diameter main valve shutter 21"a that, when the valve 35a is in a closed position, bears against the seat of the exhaust opening 18a via a frustoconical surface covered in a layer of wear material. The shutter member 21'a of the pilot valve is engaged with a certain amount of clearance in the axial direction 15 in an opening inside the shutter member 21"a of the main valve, which opening is in communication with a small-diameter exhaust channel 31a opening out into the exhaust opening 18a and against which the shutter member 21'a of the pilot valve is pressed when the valve is in the closed position.

The shutter member 21"a of the main valve further includes lateral through channels putting its central opening containing the shutter member 21'a of the pilot valve into communication with the first portion 13'a of the valve chamber 13a.

A helical return spring 32a is interposed between a thrust portion of the bearing 14a for guiding the valve rod 20a that is secured to the body 12, and a thrust plate 33a engaged on the valve rod, so as to urge the members 21'a and 21"a into their respective closed positions against the seat 18a and the channel 31a.

The structure of the second valve is analogous to the structure of the first valve and is not described in greater detail. The second valve comprises elements that are analogous to the elements described for the first valve and that are given the same reference numbers, but associated with the index letter b.

The helical return springs 32a and 32b press against respective plates 33a (or 33b), each having an opening for passing the corresponding valve rod 20a (or 20b) which has a thread on its outside surface.

An adjustment nut 34a (or 34b) is engaged on the threaded portion of the valve rod and bears against the corresponding thrust plate 33a (or 33b) so as to adjust the setting of the corresponding spring 32a (or 32b). It is thus possible to adjust the trigger pressure of the pilot valve which is urged against its own seat by the return spring 32a (or 32b).

Also in the first embodiment, the spring which is interposed between the piston and the valve shutter member 20a (or 20b) may be associated with setting means constituted by at least one plate against which the end of the spring exerts thrust and suitable for being moved along the actuation axis 5, e.g. by means of a nut or other mechanical, pneumatic, or hydraulic displacement means.

In general, at least one of the ends of the spring may be caused to thrust against an adjustable thrust plate for adjusting the setting of the spring, both in the first embodiment and in the second embodiment.

The operation of the balancer device shown in the FIGURE is described below.

While the installation is in operation, the first portions 13' and 13'b of the chambers 13a and 13b of the two valves respectively receive the first and second fluids coming from the first and second circuits of the installation, respectively 36a and 36b.

When the pressures in the two circuits are equal, or practically equal, the two valves are in the position shown in FIG. 2, the valve members 21'a, 21'b, 21"a, and 21"b being held in their closed positions against the corresponding seats of the exhaust openings and of the main valve member channels. The piston chambers as defined by the metal bellows and the rigid plates secured to the members of the two valves 35a and 35b have their outside surfaces subjected to the pressures of the first and second fluids respectively, and have their inside surfaces subjected to the pressures of the second and first fluids, respectively. By assumption, these pressures are equal or substantially equal; the piston and the deformable chamber of the first valve are subjected externally to the pressure of the first fluid which is transmitted via the channel 17a from the first portion 13'a to the second portion 13"a of the chamber 13a. The chamber inside the piston is fed via the channel 27a with the second fluid coming from the second portion 13"b of the second chamber 13b with a pressure that, by assumption, is substantially equal to the pressure of the first fluid in contact with the outside surface of the piston and of the deformable metal bellows. The piston on being subjected to no pressure difference between its inside and outside faces does not move, and the valve member is maintained in its position closing the exhaust opening 18a by means of the spring 32a, and via the shutter member 21'a of the pilot valve pressing against the inlet seat of the channel 31a.

Similarly, in the event of equal pressures inside and outside the chamber of the second piston as defined by the second bellows 24b, the second valve member 20b does not move and the spring 32b keeps the shutter members in the closed position.

In the event of a pressure difference occurring between the first and second fluids, the piston chambers defined by the deformable walls of the bellows 24a and 24b and by the outside and inside faces of the pistons are subjected to inside and outside pressures that differ from each other.

For example, if it is assumed that the pressure of the first fluid at some given moment in the operation of the installation becomes greater than the pressure of the second fluid, the first piston chamber defined by the first bellows 24a is at an inside pressure that is the pressure of the second fluid as transmitted by the channel 27a which is lower than the pressure to which its outside wall is subjected inside the second portion 13"a of the chamber 13a that receives the first fluid. Under such circumstances, the plate 22a of the first piston 22a, 24a tends to move downwards (in FIG. 2) along the actuation direction 15 of the balancer device.

Actual displacement of the piston 22a, 24a and of the valve member 20a is observed only if the force exerted is greater than the force enabling the spring 32a to be compressed, which spring is itself set to a rated pressure serving to avoid any displacement in the event of pressure differences occurring that are below some given limit (e.g. 5 bars).

When the pressure difference between the two fluids exceeds the determined value that corresponds to the width of the adjustment dead band, the valve member 20a moves downwards, such that the shutter member 21'a of the pilot valve opens the channel 31a and the first fluid can escape to the exhaust pipe.

The shutter member 21"a constituting the main valve remains in its closed position against the seat for opening the exhaust 18a.

If the pressure difference between the two fluids continues to increase, then continued downward movement of the valve member 20a can cause the shutter member 21"a of the main valve to open so that the first fluid escapes via the exhaust opening 18a at a rate that is much greater than that provided by the passage through the channel 31a.

The pressure in the first circuit drops, moderately when the pilot valve is open and then much more quickly when the main valve is open.

The pressure in the closed chamber of the second piston as defined by the second bellows 24b is greater than the pressure in the second portion 13"b of the valve chamber, so long as the pressure of the first fluid is greater than the pressure of the second fluid. The extra pressure inside the closed chamber of the second piston serves to close the second valve 20b with increasing force so long as the pressure difference between the first and second fluids increases. The second valve is closed via the second return spring 32b, by said spring being compressed.

By discharging the first fluid via the exhaust pipe 38a, the pressure in the first circuit is caused to decrease until practically equal pressures are obtained in both circuits. The first valve then closes and the system returns to the position shown in the FIGURE which allows the two circuits to operate under steady conditions at equal pressures.

If the pressure in the second circuit becomes higher than the pressure in the first circuit, because of a pressure outside the chamber of the second piston defined by the second bellows 24b becoming greater than the pressure inside said chamber, then the second valve member moves as soon as the pressure difference departs from the adjustment dead band as obtained by the setting of the second spring 32b. The second valve opens, and the first valve is held in the closed position, so that the two circuits are brought back into equal pressures by exhausting the second fluid to the storage tank.

The balancer device of the invention thus makes it possible to maintain the first and second circuits at practically equal pressures, thus avoiding any pressure difference that is harmful for the heat exchanger across its heat exchange surfaces.

During pressure fluctuations that are smaller than the width of the dead band (e.g. 5 bars), the pilot valves stay in place against their seats and the installation continues to operate under conditions that are degraded little.

Once the pressure difference between the two fluids exceeds the width of the dead band, one of the two pilot valves opens in order to return the two circuits to the same pressure.

In the event of an incident or an accident in operation, with the pressure difference between the two circuits becoming very great, then one of the two pilot valves moves very quickly so as to open the main valve and allow one of the fluids to be exhausted at a very high rate.

The balancer device of the invention thus serves to minimize pressure differences in operation between the two circuits.

The device operates entirely automatically and in a manner that is entirely independent of any energy source (e.g. electrical or hydraulic) that is external to the installation itself in which the device serves to balance pressures.

In addition, the first and second fluids are completely separated from each other, since the chambers defined by the bellows and the piston plates of the balancer device are completely closed and quite leaktight.

The assembly constituted by the piston and the deformable bellows chamber enable very high forces to be transmitted for opening the valves against the return springs of the valves. The installation can thus be made in a form that ensures that the valves are completely leaktight when closed during normal operation under steady conditions.

The balancer device of the invention is suitable for operating with fluids at high temperature, for example heat exchange fluids in an installation having a high temperature nuclear reactor.

The bellows of the piston chambers of the balancer device are also made in such a manner as to be capable of withstanding pressure corresponding to the pressure in the circuit between which pressure balancing is performed, for example 60 bars in the application envisaged above.

The invention is not strictly limited to the embodiment described above.

Thus, the device for setting the springs in order to adjust the width of the adjustment dead band in operation can be implemented by any mechanical means, for example a screw and a nut, or a cog wheel and a wormscrew, or indeed by means that are pneumatic or hydraulic.

The springs of the first and second valves may be set to different values, for example to track pressure more finely in one of the two circuits.

It is also possible to use balancer devices of the invention for balancing pressures between more than two circuits, installations, or receptacles. For example, if there are a first, a second, and a third circuit respectively containing a first, a second, and a third fluid, then a first balancer device can be used to balance pressures between the first and second circuits, and a second balancer device can be used to balance pressures between the second and third circuits. This achieves pressure balancing between all three circuits which can thus be maintained at equal pressures by using two similar balancer devices, for example.

The invention is not limited to the particular application described above, i.e. balancing pressures between two circuits of a heat exchanger in an installation for producing electricity from the heat produced by a high temperature nuclear reactor.

The balancer device of the invention can be used, for example, to balance pressures in the low pressure bodies of steam turbines.

A balancer device of the invention may also be used to balance the pressures between two receptacles containing fluids that are not to be allowed to mix together.

When the balancer device has valves with chambers that are closed by bellows, as described with reference to FIG. 2 for example, the bellows may have an arbitrary number of corrugations and not only a single toroidal corrugation as described above.

The amplitude of the displacement of the valve members can thus be increased without excessively deforming the wall of the bellows.

The bellows may be made of any metallic or non-metallic material having characteristics that can be defined as a function of the desired elasticity and resistance to the fluids with which the bellows comes into contact, as a function of the pressure and temperature conditions of said fluids.

It is possible to use a shutter assembly such as the assembly 21*a* that comprises a pilot valve shutter and a main shutter, in both the first and the second embodiments.

In both of the above-described embodiments of the balancer device, both valves comprise a common body constituting the body of the balancer device, which body is built up from a plurality of portions so as to enable the valve elements to be put into place.

Nevertheless, at least in the second embodiment, it is possible to make the two valve bodies independently and to place the valve bodies in arbitrary relative dispositions, e.g. in zones that are remote from each other and each of which is disposed close to the corresponding circuits or receptacles in which pressure balancing is being performed. Nevertheless, even under such circumstances, a pipe must be provided to enable the pressure of the second fluid to be transmitted to the valve for adjusting the pressure of the first fluid, and also to enable the pressure of the first fluid to be transmitted to the valve for adjusting the pressure of the second fluid.

The device of the invention can be used equally well for balancing gas pressures, as described above, and for balancing pressures between liquids, or indeed between liquids and gases.

The invention claimed is:

1. A device for balancing the pressures of first and second fluids contained respectively within first and second circuits or receptacles, wherein the device comprises:

first and second valves respectively comprising first and second valve bodies respectively defining first and second chambers communicating via first and second admission orifices respectively with the first and second circuits or receptacles respectively containing the first and second fluids, and communicating via respective exhaust orifices with respective exhaust means for the first and second fluids, at least one first valve member and at least one second valve member mounted to move respectively in the first and second chambers along an axial actuation direction between a position for closing and a position for opening the exhaust orifices of the first and second chambers respectively, a first piston and a second piston each constituted by a rigid plate secured respectively to the first or to the second valve member, and a flexible metal wall of a bellows secured in leak tight manner to the rigid plate of the respective piston and to an element of the first and the second valve bodies respectively, so as to constitute a closed chamber having a wall that is deformable in the actuation direction, and first and second resilient return means for returning the first and second valve members respectively into the closed position; and wherein the first closed chamber of the first piston of the first valve is in communication with the chamber of the second valve, and the closed chamber of the second piston of the second valve is in communication with the chamber of the first valve, wherein the chamber of the first valve and the chamber of the second valve are separated from each other by a wall, said wall having fixed thereon, on a first side inside the chamber of the first valve, the metal wall of the bellows of the first piston, and on a second side inside the chamber of the second valve, the metal wall of the bellows of the second piston, the separation wall of the body of the balancing device having passing therethrough a first channel for putting the first closed chamber of the first piston into communication with the chamber of the second valve, and a second channel putting the closed chamber of the second piston into communication with the chamber of the first valve.

2. A device according to claim 1, wherein the body of the first valve and the body of the second valve are interconnected and in axial alignment along a common actuation direction of the first and second valves so as to constitute a body of the balancing device.

3. A balancing device according to claim 1, wherein the body of the first valve and the body of the second valve are built from two assembled portions respectively defining a first portion of the valve chamber in which the admission opening and the exhaust opening are provided, and a second portion in which there are disposed the first and second pistons respectively, the first and second portions of the chambers of the first and second valves being separated by respective walls of the body of the valve having respective openings formed therethrough on the axial actuation direction and in which there are disposed respective guide bearings for the corresponding valve members, each of which comprises a rod mounted on the axial actuation direction with one axial end secured to the corresponding piston and with the opposite end, inside the first portion of the valve chamber, carrying a shutter member.

4. A balancing device according to claim 1, wherein the first valve member of the first valve and the second valve member of the second valve include respective shutter assemblies for shutting the exhaust openings, each of said assemblies including a pilot valve shutter member secured to one end of a rod of the valve member and a main shutter member having a surface for bearing against a seat of the exhaust opening and a central cavity in which the shutter member of the pilot valve is engaged with freedom to move along the direction of the actuation axis of the valve, the pilot valve shutter member communicating with the outside of the main valve via a channel that the pilot valve shutter member is capable of closing.

5. A device according to claim 1, wherein the first and second resilient return means of the first and second valve members are constituted by helical springs interposed between respective thrust surfaces of the first and second valve members and thrust surfaces of a valve body corresponding to the balancing device.

6. A device according to claim 5, wherein the helical spring has at least one of its ends thrusting against a thrust plate at a position that is adjustable along the actuation direction of the valve of the balancing device.

7. The use of a balancing device according to claim 1, for adjusting the pressures of first and second fluids to values that are substantially equal in respective feed circuits for first and second heat exchanger portions of a heat exchanger, the use including the following steps:
- connecting the first and second admission orifices to said respective feed circuit for first and second heat exchanges portions;
- connecting the first and second exhaust orifices to respective exhaust pipes;
- receiving the first and second fluids in the first and second chambers of the first and second valves respectively, the first and second valve member being in respective closed position,
- receiving the first and second fluids in the second and first closed chambers of the second and first valves respectively, so that when the difference of pressure between the first chamber and the second chamber is higher than a given limit the first or the second valve member moves towards its opening position.

8. A use according to claim 7, wherein the heat exchanger is a plate heat exchanger.

9. A use according to claim 7, wherein the first heat exchanger circuit is for receiving a secondary heat exchange gas containing nitrogen in an installation for producing electricity by using a high temperature nuclear reactor, and the second heat exchange circuit is the primary circuit of the high temperature nuclear reactor cooled by a gas such as helium.

* * * * *